United States Patent
Cho et al.

(10) Patent No.: US 8,673,496 B2
(45) Date of Patent: Mar. 18, 2014

(54) ELECTRODE COMPOSITION, ELECTRODE FOR LITHIUM SECONDARY BATTERY, METHOD OF MANUFACTURING THE ELECTRODE AND LITHIUM SECONDARY BATTERY INCLUDING THE ELECTRODE

(75) Inventors: Chae-Woong Cho, Yongin-si (KR); Woon-Suk Jang, Yongin-si (KR); Bum-Jin Chang, Yongin-si (KR); Ki-Jun Kim, Yongin-si (KR); Kwi-Seok Choi, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 484 days.

(21) Appl. No.: 12/982,803

(22) Filed: Dec. 30, 2010

(65) Prior Publication Data

US 2011/0281166 A1 Nov. 17, 2011

(30) Foreign Application Priority Data

May 12, 2010 (KR) ........................ 10-2010-0044496

(51) Int. Cl.
*H01M 4/48* (2010.01)
*H01M 4/485* (2010.01)
*H01M 4/26* (2006.01)
*H01M 4/505* (2010.01)
*H01M 4/52* (2010.01)

(52) U.S. Cl.
USPC ........... 429/221; 429/232; 429/223; 429/224; 429/231.1; 429/231.2; 429/231.3; 429/231.5; 29/623.1; 29/623.5

(58) Field of Classification Search
USPC .................. 429/221–224, 232, 231.1–231.5; 29/623.1
See application file for complete search history.

(56) References Cited

U.S. PATENT DOCUMENTS

2008/0050655 A1   2/2008   Chu et al.
2010/0297497 A1*  11/2010  Takahata ...................... 429/209

FOREIGN PATENT DOCUMENTS

| JP | 09-265976 | 10/1997 |
|---|---|---|
| JP | 11-040140 | 2/1999 |
| KR | 1020010046245 | 6/2001 |
| KR | 10-2007-0009447 A | 1/2007 |
| KR | 10-2008-0019533 | 3/2008 |
| KR | 10-2008-0020892 A | 3/2008 |
| KR | 1020100006409 | 1/2010 |
| WO | WO 2009/093504 A1 | 7/2009 |
| WO | WO 2009093504 A1 * | 7/2009 ............ H01M 4/02 |

OTHER PUBLICATIONS

KIPO Notice of Allowance dated Sep. 20, 2011 issued in KR 10-2010-0044496, 5 pages.

* cited by examiner

*Primary Examiner* — Karie O'Neill Apicella
(74) *Attorney, Agent, or Firm* — Christie, Parker & Hale, LLP

(57) ABSTRACT

An electrode composition containing a first conducting agent and a second conducting agent, an electrode for lithium secondary batteries, a method of manufacturing the electrode, and a lithium secondary battery including the electrode. The second conducting agent is an agglomerate formed of a conducting material and a fluorine-based polymer.

10 Claims, 2 Drawing Sheets

US 8,673,496 B2

ELECTRODE COMPOSITION, ELECTRODE FOR LITHIUM SECONDARY BATTERY, METHOD OF MANUFACTURING THE ELECTRODE AND LITHIUM SECONDARY BATTERY INCLUDING THE ELECTRODE

CROSS-REFERENCE TO RELATED APPLICATION

This application claims the benefit of Korean Application No. 10-2010-0044496, filed May 12, 2010, in the Korean Intellectual Property Office, the disclosure of which is incorporated herein by reference.

BACKGROUND

1. Field

One or more embodiments of the present invention relate to an electrode composition containing a first conducting agent and a second conducting agent, an electrode for lithium secondary batteries, a method of manufacturing the electrode, and a lithium secondary battery including the electrode.

2. Description of the Related Art

Positive or negative active materials for lithium secondary batteries are mostly nonconductive. Thus, a conducting agent is normally added to increase the conductivity of a lithium secondary battery.

However, conducting agents typically have a low density. Thus, when used to form an electrode, the conducting agent may be present more in an upper region of an active material layer and less in a lower region thereof close to a current collector. Therefore, the interfacial conductivity between the electrode and the active material layer may not be satisfactory, and improvement in this area is desirable.

SUMMARY

One or more embodiments of the present invention include an electrode composition containing an active material, a first conducting agent, a second conducting agent, a binder, and a solvent.

One or more embodiments of the present invention includes an electrode for lithium secondary batteries, which includes a first conducting agent and a second conducting agent, and thus has improved conductivity and a greater binding force, wherein the second conducting agent has a concentration gradient in an active material layer of the electrode.

One or more embodiments of the present invention include a method of manufacturing the electrode for lithium secondary batteries.

One or more embodiments of the present invention include a lithium secondary battery including the electrode.

Additional aspects will be set forth in part in the description which follows and, in part, will be apparent from the description, or may be learned by practice of the presented embodiments.

According to one or more embodiments of the present invention, an electrode composition includes an active material; a first conducting agent having an average particle diameter of about 10 to about $1 \times 10^3$ nm; a second conducting agent having an average particle diameter of greater than $1 \times 10^3$ to about $4 \times 10^5$ nm; a binder; and a solvent, wherein the second conducting agent is an agglomerate of a conducting material having an average particle diameter of about to about $1 \times 10^3$ nm and a fluorine-based polymer.

According to one or more embodiments of the present invention, an electrode for a lithium battery includes a current collector and an active material layer containing an active material, wherein the active material layer includes a first conducting agent having an average particle diameter of about 10 to about $1 \times 10^3$ nm, and a second conducting agent having an average particle diameter of greater than $1 \times 10^3$ to about $4 \times 10^5$ nm, wherein the second conducting agent has a concentration gradient in a region of the active material layer adjacent to the current collector, such that the concentration of the second conducting agent decreases in a direction through the active material layer away from the current collector.

According to a non-limiting aspect, the second conducting agent may include an agglomerate of a conducting material having an average particle diameter of about 10 to about $1 \times 10^3$ nm, and a fluorine-based polymer.

According to one or more embodiments of the present invention, a method of manufacturing an electrode includes mixing an active material, a first conducting agent having an average particle diameter of about 10 to about $1 \times 10^3$ nm, a second conducting agent, a binder, and a solvent to prepare an electrode composition; and coating the electrode composition onto a current collector, wherein the second conducting agent is prepared by mixing and thermally treating a composition that contains a conducting material having an average particle diameter of about 10 to about $1 \times 10^3$ nm and a fluorine-based polymer to produce an aggregate, wherein the second conducting agent has a average particle diameter that is greater than that of the first conducting agent According to one or more embodiments of the present invention, a method of manufacturing an electrode includes mixing and thermally treating a composition that contains a conducting agent including a first portion of a first conducting agent, and a fluorine-based polymer, to prepare a second conducting agent; mixing an active material, a second portion of the first conducting agent, the second conducting agent, a binder, and a solvent to prepare an electrode composition; and coating the electrode composition onto a current collector.

According to one or more embodiments of the present invention, a lithium battery includes the electrode described above.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Figure 1:
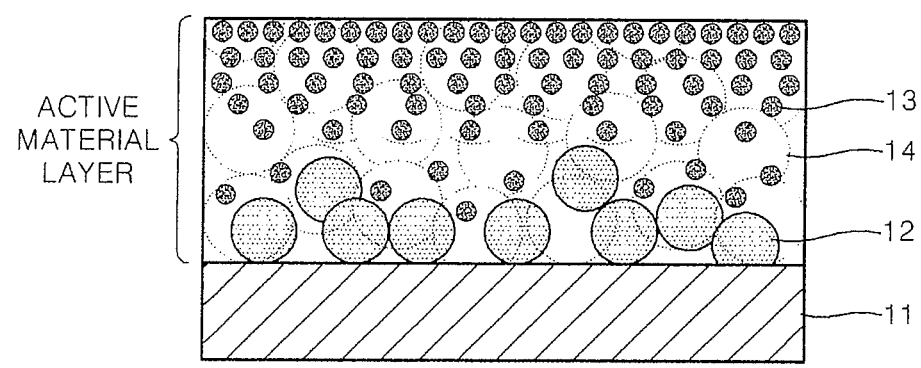
FIG. 1 is a diagram illustrating the distribution of an active material, a first conducting agent, and a second conducting agent in an active material layer of an electrode, according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

One or more embodiments of the present invention include an electrode composition that contains an active material, a first conducting agent having an average particle diameter of about 10 to about $1\times10^3$ nm, a second conducting agent having an average particle diameter of about $1\times10^3$ to about $4\times10^5$ nm, a binder, and a solvent, wherein the second conducting agent is an agglomerate of a conducting material having an average particle diameter of about 10 to about $1\times10^3$ nm and a fluorine-based polymer.

The second conducting agent may be an agglomerate obtained by the binding of at least one kind of a first conducting agent and the fluorine-based polymer. It is to be understood that the conducting material that is used in forming the second conducting agent may be the same as or different from the first conducting agent that is present as such in the electrode composition. For convenience herein, the conducting material having an average particle diameter of about 10 to about $1\times10^3$ nm that is present in the agglomerate of the second conducting agent may be referred to as the "first conducting agent," even though it is to be understood that the conductive material in the second conducting agent may be the same as or different from the first conducing agent that is separately present in the electrode composition.

The second conducting agent, which is an agglomerate of the first conducting agent and the fluorine-based polymer, may be prepared by mixing the first conducting agent with a solution of the fluorine-based polymer, dispersing the mixture, agglomerating the mixture by using a granulating device, and thermally treating the agglomerated mixture. The solvent may be selected from the group consisting of N-methylpyrrolidone (NMP), methanol, ethanol, n-propanol, isopropanol and water.

The active material may be a positive electrode material. For example, the active material may include at least one material selected from the group consisting of $LiFePO_4$, $LiCoO_2$, $Li(NiCoMn)O_2$, $LiMnO_2$, $LiMn_2O_4$, $LiFeVO_4$, $LiMnPO_4$, and $LiCoPO_4$. Alternatively, the active material may be a negative active material. For example, the active material may include carbonaceous materials, such as amorphous carbon, graphite, natural graphite, mesocarbon microbeads (MCMB), and pitch-based carbon fiber, or conductive polymers, such as polyacene.

The total amount of the first conducting agent and the second conducting agent in the electrode composition may be in a range of about 2 to about 10 parts by weight, or, as a specific, non-limiting example, about 4 to about 7 parts by weight, based on 100 parts by weight of the active material.

The amount of the second conducting agent in the electrode composition may be in a range of about 10 to about 100 parts by weight, or as a specific, non-limiting example, about 10 to about 50 parts by weight, based on 100 parts by weight of the first conducting agent that is separately present in the electrolyte composition. The amount of the fluorine-based polymer in the electrode composition may be in a range of about 1 to 30 parts by weight, based on 100 parts by weight of the first conducting agent One or more embodiments of the present invention include an electrode for lithium batteries, the electrode including a current collector and an active material layer, wherein the active material layer contains a first conducting agent and a second conducting agent, and the second conducting agent has a concentration gradient in a region of the active material layer adjacent to the current collector, wherein the concentration of the second conducting agent decreases in a direction through the active material layer away from the current collector.

The first conducting agent may have an average particle diameter of about 10 to about $1\times10^3$ nm, or, as a specific, non-limiting example, about 30 to about 100 nm. The second conducting agent may have an average particle diameter of greater than $1\times10^3$ to about $4\times10^5$ nm, or, as a specific, non-limiting example, about $1\times10^4$ to about $1\times10^5$ nm. In other words, the second conducting agent has a greater average particle diameter than the first conducting agent.

In general, an active material layer of an electrode includes an active material, a conducting agent, and a binder. In particular, the active material layer is typically formed by dispersing the active material, the conducting agent, and the binder in a solvent to prepare an active material composition, and coating the active material composition onto a current collector. However, conducting agents typically have a low density. Thus, when a low density conducting agent is used to form the electrode, the conducting agent may be present more in an upper region of the active material layer and less in a lower region thereof close to the current collector. As used herein, the term "lower" refers to being in a direction closest to a substrate such as a current collector of an electrode plate on which the active material layer is deposited and the term "upper" refers to a direction away from the substrate.

According to Stokes's law, as reproduced in Equation (1), the sedimentation rate of small spherical particles in a fluid medium is proportional to the density difference between the small spherical particles and the fluid medium and to the radius of the small spherical particles.

$$V = 2/9(d_1-d_2)gr^2/\eta \quad (1)$$

wherein V denotes the sedimentation rate of small spherical particles, $d_1$ denotes the density of small spherical particles, $d_2$ denotes the density of a liquid medium, g denotes the gravitational constant, and r denotes the radius of small spherical particles.

According to the present embodiment, the radius of the agglomerate of the second conducting agent is markedly larger than that of the first conducting agent. Thus, the sedimentation rate of the agglomerate of the second conducting agent is faster than that of the first conducting agent, and thus, a relatively greater amount of the second conducting agent is distributed near the current collector, as compared to an electrode manufactured using conventional methods.

FIG. 1 is a diagram illustrating the distribution of an active material 14, a first conducting agent 13 and a second conducting agent 12 in an active material layer of an electrode formed on a current collector 11 according to an embodiment of the present invention.

Referring to FIG. 1, since the average particle diameter of the second conducting agent 12 is larger than that of the first conducting agent 13, a larger amount of the second conducting agent 12 is distributed in a lower part of the active material layer than in an upper part thereof.

Thus, the amount of the conducting agent near the current collector is greater than in conventional electrodes, and thus, the interfacial resistance between the current collector and the active material layer is reduced, thereby improving conductivity of the electrode.

The amount of the second conducting agent in the electrode may be in a range of about 10 to about 100 parts by weight, or as a specific, non-limiting example, about 10 to about 50 parts by weight, based on 100 parts by weight of the first conducting agent.

The amount of the fluorine-based polymer in the electrode may be in a range of about 1 to 30 parts by weight, or as a specific, non-limiting example, about 1 to 10 parts by weight, based on 100 parts by weight of the first conducting agent.

Examples of the fluorine-based polymer include polyvinylidene fluoride (PVdF), a vinylidenechloride/hexafluoropropylene copolymer, and the like. For example, the fluorine-based polymer may be polyvinylidene fluoride.

The total amount of the first conducting agent and the second conducting agent in the active material layer may be in a range of about 2 to about 10 parts by weight, or, as a specific, non-limiting example, about 4 to about 7 parts by weight, based on 100 parts by weight of the active material in the active material layer.

In general, an electrode includes an active material, a conducting agent, and a binder. In particular, the electrode is formed by appropriately mixing and dispersing the active material, the conducting agent and the binder in a solvent to prepare an electrode composition, and coating the electrode composition onto a current collector. The conductivity of the electrode is significantly dependent on the distribution uniformity of the conducting agent. In addition, the distribution uniformity of the conducting agent is influenced by the dispersity of the conducting agent in the electrode composition. In general, a bead milling process is used to improve the conductivity of the conducting agent; however, this approach has limitations.

One or more embodiments of the present invention includes a method of manufacturing an electrode, the method including: mixing a conducting agent including a first portion of a first conducting agent and a fluorine-based polymer and thermally treating the mixture to prepare a second conducting agent; preparing an electrode composition containing an active material, a second portion of the first conducting agent, the second conducting agent, a binder, and a solvent; and coating the electrode composition onto a current collector to form an active material layer.

The active material layer may have a thickness of about 60 to about 400 μm. The current collector, which is an aluminum (Al) electrode, may have a thickness of about 10 to about 50 μm, or as a specific, non-limiting example, about 10 to about 30 μm.

The total amount of the first conducting agent and the second conducting agent in the active material layer may be in a range of about 2 to about 10 parts by weight, or as a specific, non-limiting example, about 4 to about 7 parts by weight, based on 100 parts by weight of the active material in the active material layer.

Alternatively, a method of manufacturing an electrode may include mixing and stirring about 2 to about 7 parts by weight of a first conducting agent, about 0.5 to about 3 parts by weight of a second conducting agent, which is an agglomerate of the first conducting agent and a fluorine-based polymer, about 3 to about 7 parts by weight of a binder, and about 90 to 130 parts by weight of a solvent, based on 100 parts by weight of an active material, to prepare an electrode composition, and coating the electrode composition onto a current collector.

The solvent for the electrode composition for lithium secondary batteries may be selected from the group consisting of N-methylpyrrolidone (NMP), methanol, ethanol, n-propanol, isopropanol and water.

A compound (lithiated intercalation compound) which allows reversible intercalation and deintercalation of lithium ions may be used as the positive active material. In particular, the positive active material may be at least one composite oxide of lithium and a metal selected from the group consisting of cobalt, manganese, nickel, and a combination thereof. Examples of the positive active material may include compounds represented by the following formulae.

$Li_aA_{1-b}X_bD_2$ (wherein $0.95 \le a \le 1.1$, and $0 \le b \le 0.5$); $Li_aE_{1-b}X_bO_{2-c}D_c$ (wherein $0.95 \le a \le 1.1$, $0 \le b \le 0.5$, and $0 \le c \le 0.05$); $LiE_{2-b}X_bO_{4-c}D_c$ (wherein $0 \le b \le 0.5$ and $0 \le c \le 0.05$); $Li_aNi_{1-b-c}Co_bB_cD_\alpha$ (wherein $0.95 \le a \le 1.1$, $0 \le b \le 0.5$, $0 \le c \le 0.05$, and $0 < \alpha \le 2$); $Li_aNi_{1-b-c}Co_bX_cO_{2-\alpha}M_\alpha$ (wherein $0.95 \le a \le 1.1$, $0 \le b \le 0.5$, $0 \le c \le 0.05$, and $0 < \alpha < 2$); $Li_aNi_{1-b-c}Co_bX_cO_{2-\alpha}M_2$ (wherein $0.95 \le a \le 1.1$, $0 \le b \le 0.5$, $0 \le c \le 0.05$, and $0 < \alpha < 2$); $Li_aNi_{1-b-c}Mn_bX_cD_\alpha$ (wherein $0.95 \le a \le 1.1$, $0 \le b \le 0.5$, $0 \le c \le 0.05$, and $0 < \alpha < 2$); $Li_aNi_{1-b-c}Mn_bX_cO_{2-\alpha}M_\alpha$ (wherein $0.95 \le a \le 1.1$, $0 \le b \le 0.5$, $0 \le c \le 0.5$, and $0 < \alpha < 2$); $Li_aNi_{1-b-c}Mn_bX_cO_{2-\alpha}M_2$ (wherein $0.95 \le a \le 1.1$, $0 \le b \le 0.5$, $0 \le c \le 0.05$, and $0 < \alpha < 2$); $Li_aNi_bE_cG_dO_2$ (wherein $0.90 \le a \le 1.1$, $0 \le b \le 0.9$, $0 \le c \le 0.5$, and $0.001 \le d \le 0.1$); $Li_aNi_bCo_cMn_dGeO_2$ (wherein $0.90 \le a \le 1.1$, $0 \le b \le 0.9$, $0 \le c \le 0.5$, $0 \le d \le 0.5$, and $0.001 \le e \le 0.1$); $Li_aNiG_bO_2$ (wherein $0.90 \le a \le 1.1$ and $0.001 \le b \le 0.1$); $Li_aCoG_bO_2$ (wherein $0.90 \le a \le 1.1$ and $0.001 \le b \le 0.1$); $Li_aMnG_bO_2$ (wherein $0.90 \le a \le 1.1$ and $0.001 \le b \le 0.1$); $Li_aMn_2G_bO_4$ (wherein $0.90 \le a \le 1.1$ and $0.001 \le b \le 0.1$); $QO_2$; $QS_2$; $LiQS_2$; $V_2O_5$; $LiV_2O_5$; $LiZO_2$; $LiNiVO_4$; $Li_{(3-f)}J_2(PO_4)_3$ (wherein $0 \le f \le 2$); $Li_{(3-f)}Fe_2(PO_4)_3$ (wherein $0 \le f \le 2$); $LiFePO_4$; and $Li(NiCoMn)O_2$.

In the above formulae, A is selected from the group consisting of nickel (Ni), cobalt (Co), manganese (Mn), and combinations thereof; X is selected from the group consisting of aluminum (Al), nickel (Ni), cobalt (Co), manganese (Mn), chromium (Cr), iron (Fe), magnesium (Mg), strontium (Sr), vanadium (V), a rare earth element, and combinations thereof; D is selected from the group consisting of oxygen (O), fluorine (F), sulfur (S), phosphorus (P), and combinations thereof; E is selected from the group consisting of cobalt (Co), manganese (Mn), and combinations thereof; M is selected from the group consisting of fluorine (F), sulfur (S), phosphorus (P), and combinations thereof; G is selected from the group consisting of aluminum (Al), chromium (Cr), manganese (Mn), iron (Fe), magnesium (Mg), lanthanum (La), cerium (Ce), strontium (Sr), vanadium (V), and combinations thereof; Q is selected from the group consisting of titanium (Ti), molybdenum (Mo), manganese (Mn), and combinations thereof; Z is selected from the group consisting of chromium (Cr), vanadium (V), iron (Fe), scandium (Sc), yttrium (Y), and combinations thereof; and J is selected from the group consisting of vanadium (V), chromium (Cr), manganese (Mn), cobalt (Co), nickel (Ni), copper (Cu), and combinations thereof. Examples of the positive active material include $LiFePO_4$, $LiCoO_2$, $Li(NiCoMn)O_2$, $LiMnO_2$, $LiMn_2O_4$, $LiFeVO_4$, $LiMnPO_4$, $LiCoPO_4$ and a mixture thereof.

The compounds listed above as positive active materials may have a surface coating layer (hereinafter, "coating layer"). Alternatively, a mixture of a compound without having a coating layer and a compound having a coating layer, the compounds being selected from the compounds listed above, may be used. The coating layer may include at least one compound of a coating element selected from the group consisting of oxides, hydroxides, oxyhydroxides, oxycarbonates, and hydroxycarbonates of the coating element. The compounds for the coating layer may be amorphous or crystalline. The coating element contained in the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or mixtures thereof.

The coating layer may be formed using any method, for example, a spray coating method, a dipping method, or the like, which does not adversely affect the physical properties of the positive active material when a compound of such a coating element is used. This is obvious to one of ordinary skill in the art, and thus a detailed description thereof will not be provided.

The binder for the electrode composition for lithium secondary batteries may be any binder that is generally used in preparing electrode compositions for lithium secondary batteries.

The conducting agent is used to provide conductivity to the electrode. Any electrical conducting material that does not induce a chemical change may be used. Examples of the conducting agent include carbonaceous materials, such as natural graphite, artificial graphite, carbon black, acetylene black, ketchen black, carbon fibers, and the like; metal-based materials, such as copper (Cu), nickel (Ni), aluminum (Al), silver (Ag), and the like, in powder or fiber form; and conductive materials, including conductive polymers, such as a polyphenylene derivative, and mixtures thereof.

The binder for the electrode composition for lithium secondary batteries strongly binds, for example, active material particles together and to the current collector. Examples of the binder include, but are not limited to, polyvinyl alcohol, carboxymethyl cellulose, hydroxypropyl cellulose, diacetyl cellulose, polyvinyl chloride, carboxylated polyvinyl chloride, polyvinyl fluoride, and a polymer having ethylene oxide, polyvinylpyrrolidone, polyurethane, polytetrafluoroethylene, polyvinylidene fluoride, polyethylene, polypropylene, styrene-butadiene rubber (SBR), acrylated SBR, and epoxy resin, nylon. For example, the binder may be a polyvinylidene fluoride (PVdF)-based binder. The binder may be used in preparing the second conducting agent.

Figure 2:
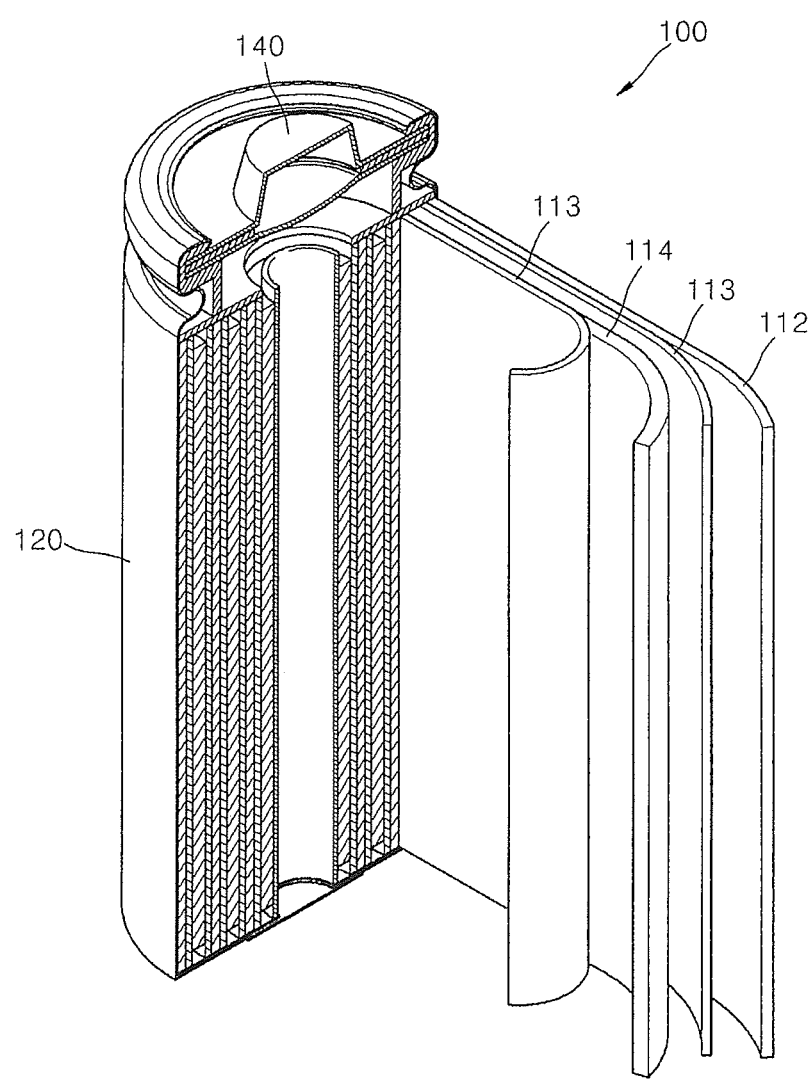
FIG. 2 is a schematic view of a lithium secondary battery according to an embodiment of the present invention.

FIG. 2 is a schematic view of a lithium secondary battery 100 according to an embodiment of the present invention.

Referring to FIG. 2, the lithium secondary battery 100 according to the present embodiment includes a positive electrode 114, a negative electrode 112 and a separator 113 disposed between the positive electrode 114 and the negative electrode 112, and an electrolyte (not shown) impregnated into the positive electrode 114, the negative electrode 112 and the separator 113, a battery case 120, and a sealing member 140 for sealing the case 120. The lithium secondary battery 100 is manufactured by sequentially stacking the positive electrode 114, the negative electrode 112 and the separator 113 to form a stack, winding the stack in a spiral form, and accommodating the wound stack in the battery case 120.

One or more embodiments of the present invention include a lithium battery including the electrode. It is to be understood that the lithium battery may differ from that shown in FIG. 2.

The electrode described herein may be used as a positive electrode or a negative electrode. For example, the electrode may be used as a positive electrode. When used as a positive electrode, the electrode may be manufactured as described above.

A negative electrode may be manufactured as follows. A negative active material, a conducting agent, a binder, and a solvent are mixed to prepare a negative active material composition. The negative active material composition is directly coated onto a copper current collector to prepare a negative electrode plate. Alternatively, the negative active material composition may be cast on a separate support to form a negative active material film, and then the negative active material film may be separated from the support and then laminated on a copper current collector to prepare a negative electrode plate. The amounts of the negative active material, the conducting agent, the binder, and the solvent may be the same as those commonly used in a lithium battery.

Examples of the negative active material include, but are not limited to, a lithium metal, a lithium alloy, a carbonaceous material, and graphite. The conducting agent, the binder, and the solvent in the negative active material composition may be the same as those in the positive active material composition. If required, a plasticizer may be added to the positive active material composition and the negative active material composition to produce pores in the electrode plates.

The separator for the lithium battery may be any separator that is commonly used in lithium batteries. For example, a separator having a low resistance to the migration of ions and excellent electrolyte solution retaining ability may be used. Examples of the separator include glass fiber, polyester, TEFLON, polyethylene, polypropylene, polytetrafluoroethylene (PTFE), and a combination thereof, each of which may be a nonwoven fabric or a woven fabric. For example, a windable separator formed of polyethylene or polypropylene may be used for lithium ion batteries. In addition, a separator having an excellent organic electrolyte solution retaining capability may be used for lithium ion polymer batteries.

The separator may be interposed between the positive electrode plate and the negative electrode plate to form a battery assembly. The battery assembly may be wound or folded and encased in a cylindrical battery case or a square battery case. An organic electrolyte solution is then injected into the battery case to complete the manufacture of a lithium ion battery. Alternatively, a plurality of such battery assemblies may be laminated to form a bi-cell structure and impregnated with an organic electrolyte solution. Then, the resulting structure may be encased in a pouch and sealed to complete the manufacture of a lithium ion polymer battery.

The electrolyte solution may include a nonaqueous organic solvent and a lithium salt. Any kind of various additives, for example, an overcharging inhibitor, may be further added, if required.

The nonaqueous organic solvent may function as a migration medium of ions involved in electrochemical reactions in batteries.

Examples of the nonaqueous organic solvent may include carbonates, esters, ethers, ketones, alcohols, and aprotic solvents. Examples of the carbonates available as the nonaqueous organic solvent may include dimethyl carbonate (DMC), diethyl carbonate (DEC), dipropyl carbonate (DPC), methylpropyl carbonate (MPC), ethylpropyl carbonate (EPC), methyl ethyl carbonate (MEC), ethylene carbonate (EC), propylene carbonate (PC), butylene carbonate (BC), and ethyl methyl carbonate (EMC). Examples of the esters available as the nonaqueous organic solvents may include methyl acetate, ethyl acetate, n-propyl acetate, dimethyl acetate, methyl propionate, ethyl propionate, γ-butyrolactone, decanolide, valerolactone, mevalonolactone, and caprolactone. Examples of the ethers available as the nonaqueous organic solvent may include dibutyl ether, tetraglyme, diglyme, dimethoxyethane, 2-methyltetrahydrofuran, and tetrahydrofuran. An example of the ketones available as the nonaqueous organic solvent may be cyclohexanone. Examples of the alcohols available as the nonaqueous organic solvent may include ethyl alcohol, isopropyl alcohol, and the like. Examples of the non-protic solvents may include nitriles, such as R—CN (wherein R is a straight, branched or cyclic C2-C20 hydrocarbon group, which may have a double-bonded aromatic ring or an ether bond); amides, such as dimethylformamide; dioxolanes, such as 1,3-dioxolane; and sulfolanes.

The nonaqueous organic solvent may be used alone. Alternatively, at least two of the nonaqueous organic solvents may be used in combination. In this case, a mixing ratio of the at least two of the nonaqueous organic solvents may appropriately vary according to the performance of the battery, which is obvious to one of ordinary skill in the art.

The lithium salt is dissolved in the organic solvent and functions as a source of lithium ions in the battery, enabling the basic operation of the lithium battery. In addition, the lithium salt facilitates the migration of lithium ions between the positive electrode and the negative electrode. Examples of the lithium salt may include at least one supporting electrolyte salt selected from the group consisting of $LiPF_6$, $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein x and y are natural numbers), LiCl, LiI, and $LiB(C_2O_4)_2$ (LiBOB; lithium bis(oxalato) borate). The concentration of the lithium salt may be in the range of about 0.1 to about 2.0M. When the concentration of the lithium salt is within this range, the electrolyte may have an appropriate conductivity and viscosity, and thus may exhibit excellent performance, thereby allowing lithium ions to effectively migrate.

Thereinafter, one or more embodiments of the present invention will be described in detail with reference to the following examples. These examples are for illustrative purposes only and are not intended to limit the scope of the one or more embodiments of the present invention.

Example 1

100 parts by weight of a first conducting agent having an average particle diameter of about 50 nm and 50 parts by weight of a 5 wt % solution of polyvinylidene fluoride (PVdF) in N-methyl-2-pyrrolidone (NMP) were mixed. Then, the mixture was placed in a granulating machine (NMG-1L, Nara Machinery Co. Ltd.). The main axial motor was rotated at 2000 rpm to uniformly disperse the first conducting agent, and simultaneously the granulating blade was rotated at 3000 rpm to obtain a second conducting agent having an average particle diameter of about $1\times10^5$ nm. This process was continued for 30 minutes. The resulting mixture was thermally treated at 120° C. for 1 hour to obtain the final second conducting agent.

Example 2

Manufacture of Electrode 4.44 parts by weight of carbon black having an average particle diameter of 50 nm, as the first conducting agent, 1.12 parts by weight of the second conducting agent having an average particle diameter of $1\times10^5$ nm, 5.56 parts by weight of PVdF, and 111.11 parts by weight of N-methyl-2-pyrrolidone (NMP) as the solvent, each based on 100 parts by weight of $LiFePO_4$, were mixed to prepare an electrode composition.

The electrode composition was coated on an Al substrate and dried at 100° C. for about 1 hour to manufacture an electrode for lithium secondary batteries, having a thickness of about 350° C. The electrode was used as a positive electrode.

Comparative Example 1

Manufacture of Electrode 5.56 parts by weight of carbon black having an average particle diameter of 50 nm, as the first conducting agent, 5.56 parts by weight of PVdF, and 111.11 parts by weight of NMP as the solvent, each based on 100 parts by weight of $LiFePO_4$, were mixed to prepare an electrode composition.

An electrode was manufactured using the electrode composition in the same manner as used in Example 2.

The cell resistances of the electrodes of Example 2 and Comparative Example 1 and the average resistance of electrode plates thereof were measured. The results are shown in Table 1.

TABLE 1

| | Example 2 | Comparative Example 1 |
|---|---|---|
| Cell resistance | 31.7 mΩ | 35.4 mΩ |
| Electrode plate resistance | 344 Ω/m² | 639 Ω/m² |

Referring to Table 1, the lithium battery of Example 2 had a cell resistance of 31.7 mΩ, which is smaller than the lithium battery of Comparative Example 1 having a cell resistance of 35.4 mΩ.

In addition, the electrode plate resistance of the lithium battery of Example 2, which was 344 Ω/m2, was significantly smaller than that of the lithium battery of Comparative Example 1, which was 639 $Ω/m^2$. This is attributed to the distribution of a relatively large amount of the second conducting agent in the electrode plates of the lithium battery of Example 2, which improved interfacial conductivity, lowering interfacial resistance. Due to the decrease in electrode plate resistance, the lithium battery of Example 2 may have improved performance.

Example 3

Manufacture of Battery

The electrode manufactured according to Example 2 was punched into a circular piece having a diameter φ=13 mm. The circular piece was used to form a positive electrode having a shape suitable for welding. The positive electrode was welded to a bottom of a 2032 coin cell and evacuated in a vacuum oven at 110° C. for 5 hours.

Next, a lithium electrode (negative electrode), a polyethylene separator having a thickness of 20 μm, and an electrolyte solution (containing a mixture of ethylene carbonate (EC) and ethylmethyl carbonate (EMC) in a volume ratio of 3:7 and 1.3M $LiPF_6$) were assembled to manufacture a lithium battery.

Comparative Example 2

Manufacture of Battery

A lithium secondary battery was manufactured in the same manner as in Example 3, except that the electrode of Comparative Example 1 was used as the positive electrode.

The discharge capacities of the lithium secondary batteries of Example 3 and Comparative Example 2 were measured.

As a result, the lithium secondary battery of Example 3 had improved discharge capacity, as compared to the lithium secondary battery of Comparative Example 2.

As described above, according to the one or more of the above embodiments of the present invention, a first conducting agent and a second conducting agent are used for manufacturing an electrode of a lithium battery, and thus, the conductivity of the electrode, and the binding force of an active material layer of the electrode to a current collector and the interfacial conductivity therebetween may be improved.

Although a few embodiments of the present invention have been shown and described, it would be appreciated by those skilled in the art that changes may be made in this embodi-

What is claimed is:

1. An electrode for a lithium battery, comprising a current collector and an active material layer containing an active material,
wherein the active material layer includes a first conducting agent having an average particle diameter of about 10 to about $1\times10^3$ nm, and a second conducting agent having an average particle diameter of greater than $1\times10^3$ to about $4\times10^5$ nm, wherein the second conducting agent has a concentration gradient in a region of the active material layer adjacent to the current collector such that the concentration of the second conducting agent decreases in a direction through the active material layer away from the current collector, and wherein the active material is mixed with the first conducting agent and the second conducting agent in the active material layer.

2. The electrode of claim 1, wherein a conducting material that forms an agglomerate of the second conducting agent has the same composition as the first conducting agent.

3. The electrode of claim 1, wherein a conducting material that forms an agglomerate of the second conducting agent has a different composition from the first conducting agent.

4. The electrode of claim 1, wherein an amount of the second conducting agent is in a range of about 10 to about 100 parts by weight based on 100 parts by weight of the first conducting agent.

5. The electrode of claim 1, wherein a total amount of the first conducting agent and the second conducting agent is in a range of about 2 parts by weight to about 10 parts by weight based on 100 parts by weight of the active material in the active material layer.

6. The electrode of claim 1, wherein the active material comprises at least one material selected from the group consisting of $LiFePO_4$, $LiCoO_2$, $Li(NiCoMn)O_2$, $LiMnO_2$, $LiMn_2O_4$, $LiFeVO_4$, $LiMnPO_4$, and $LiCoPO_4$.

7. The electrode of claim 1, wherein each of the first conducting agent and the second conducting agent comprises at least one material selected from the group consisting of carbon black, acetylene black, and ketchen black.

8. The electrode of claim 1, wherein the second conducting agent comprises an agglomerate of a conducting material having an average particle diameter of about 10 to about $1\times10^3$ nm and a fluorine-based polymer.

9. The electrode of claim 8, wherein an amount of the fluorine-based polymer is in a range of about 1 to about 30 parts by weight based on 100 parts by weight of the first conducting agent.

10. A lithium battery comprising the electrode of claim 1.

* * * * *